United States Patent
Zhang et al.

(10) Patent No.: US 10,388,234 B2
(45) Date of Patent: Aug. 20, 2019

(54) DOUBLE-SIDED DISPLAY DEVICE, SYSTEM, AND METHOD

(71) Applicants: BOE TECHNOLOGY GROUP CO., LTD., Beijing (CN); BEIJING BOE DISPLAY TECHNOLOGY CO., LTD., Beijing (CN)

(72) Inventors: Chunbing Zhang, Beijing (CN); Rui Guo, Beijing (CN); Hao Zhou, Beijing (CN); Weihao Hu, Beijing (CN); Liang Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 141 days.

(21) Appl. No.: 15/713,488

(22) Filed: Sep. 22, 2017

(65) Prior Publication Data
US 2018/0144696 A1    May 24, 2018

(30) Foreign Application Priority Data
Nov. 24, 2016    (CN) .......................... 2016 1 1045130

(51) Int. Cl.
*G09G 3/36*    (2006.01)
*G09G 3/20*    (2006.01)
*G06F 21/84*    (2013.01)

(52) U.S. Cl.
CPC ........... *G09G 3/3607* (2013.01); *G06F 21/84* (2013.01); *G09G 3/2003* (2013.01);
(Continued)

(58) Field of Classification Search
CPC .. G09G 3/3607; G09G 3/2003; G09G 3/2074; G09G 2300/023;
(Continued)

(56) References Cited

U.S. PATENT DOCUMENTS 7,034,451 B2 *  4/2006  Senbonmatsu ..... H01L 51/5281
                                                    313/498
10,134,362 B2 * 11/2018 Zhang .................. G09G 3/2003
(Continued)

FOREIGN PATENT DOCUMENTS

CN        102914899 A      2/2013
CN        203131706 U      8/2013
(Continued)

OTHER PUBLICATIONS

First Office Action issued in Chinese Patent Application No. 201611045130.2, dated Nov. 5, 2018; with English translation.

*Primary Examiner* — Peter D McLoone
(74) *Attorney, Agent, or Firm* — McDermott Will & Emery LLP

(57) ABSTRACT

A double-sided display device includes: a first display layer, configured to implement output of a display signal of a first side; and a second display layer, configured to implement output of a display signal of a second side; a conversion layer positioned between the first display layer and the second display layer, which switches between a light-transmitting state and an opaque light-shielding state. The conversion layer is in the light-shielding state during a display phase, and in the light-transmitting state during an interfering phase which follows the display phase. During the interfering phase, the first display layer is further configured to output a first interfering signal to interfere with the image displayed by the second side, and the second display layer is further configured to output a second interfering signal to interfere with the image displayed by the first side.

12 Claims, 3 Drawing Sheets

(52) U.S. Cl.
CPC ..... *G09G 3/2074* (2013.01); *G09G 2300/023* (2013.01); *G09G 2300/0452* (2013.01); *G09G 2358/00* (2013.01); *G09G 2360/00* (2013.01)

(58) Field of Classification Search
CPC ....... G09G 2300/0452; G09G 2358/00; G09G 2360/00; G06F 21/84
See application file for complete search history.

(56) References Cited

U.S. PATENT DOCUMENTS

| | | | | |
|---|---|---|---|---|
| 2004/0070809 | A1* | 4/2004 | Senbonmatsu | H01L 51/5281 359/245 |
| 2010/0177112 | A1* | 7/2010 | Miyasaka | G06F 21/84 345/589 |
| 2011/0286073 | A1* | 11/2011 | Lo | G02B 26/005 359/290 |
| 2012/0019434 | A1* | 1/2012 | Kuhlman | G02F 1/13306 345/1.3 |
| 2014/0204039 | A1* | 7/2014 | Miller | G02F 1/13338 345/173 |
| 2014/0301109 | A1 | 10/2014 | Kim et al. | |
| 2016/0027391 | A1* | 1/2016 | Gibson | G02B 6/0063 345/690 |
| 2016/0274412 | A1* | 9/2016 | Gu | G02F 1/133555 |
| 2017/0103718 | A1* | 4/2017 | Miller | G02F 1/13338 |
| 2017/0213503 | A1 | 7/2017 | Zhang et al. | |
| 2017/0278443 | A1* | 9/2017 | Zhang | H01L 51/5012 |
| 2018/0088415 | A1* | 3/2018 | Zhang | G09G 3/3413 |
| 2018/0233108 | A1* | 8/2018 | Zhang | H01L 51/5281 |

FOREIGN PATENT DOCUMENTS

| | | |
|---|---|---|
| CN | 103293793 A | 9/2013 |
| CN | 105489188 A | 4/2016 |
| CN | 105552105 A | 5/2016 |
| CN | 105627194 A | 6/2016 |
| JP | 08-101382 A | 4/1996 |

* cited by examiner

DOUBLE-SIDED DISPLAY DEVICE, SYSTEM, AND METHOD

CROSS-REFERENCE TO RELATED APPLICATION

This application claims priority to Chinese Patent Application No. 201611045130.2, filed on Nov. 24, 2016, titled "DOUBLE-SIDED DISPLAY DEVICE, SYSTEM, AND METHOD", which is incorporated herein by reference in its entirety.

TECHNICAL FIELD

The present disclosure relates to display field, more particularly, to a double-sided display device, system and method.

BACKGROUND

With display equipment being universally popularized, people's attention has been focused on information security of display equipment. Peeping is one of the important factors which affect information security. Although anti-peeping display technologies and products are emerging, there is no specific method and device to solve the anti-peeping problem of double-sided display.

SUMMARY

A double-sided display device is provided in an embodiment of the present disclosure, comprising: a first display layer, configured to implement output of a display signal of a first side of the double-sided display device, making the first side of the double-sided display device display an image, a second display layer, configured to implement output of a display signal of a second side of the double-sided display device, making the second side of the double-sided display device display an image, and a conversion layer positioned between the first display layer and the second display layer, which switches between a light-transmitting state and an opaque light-shielding state, wherein, the conversion layer is in the light-shielding state during a display phase, and in the light-transmitting state during an interfering phase which follows the display phase; the first display layer is further configured to output a first interfering signal to interfere with the image displayed by the second side during the interfering phase, and the second display layer is further configured to output a second interfering signal to interfere with the image displayed by the first side during the interfering phase, making an unauthorized user not able to obtain a valid picture.

Optionally, both the first display layer and the second display layer comprise a plurality of pixels, each of the plurality of pixels comprising a plurality of subpixels in different primary colours respectively, wherein, the subpixels of the first display layer and the subpixels of the second display layer are positioned in one-to-one correspondence; the primary colour of one of the subpixels of the first display layer is not identical with that of a corresponding subpixel of the subpixels of the second display layer.

Optionally, each of the pixels of the first display layer and the second display layer comprises three kinds of subpixels in primary colours of red, green and blue respectively; corresponding to a subpixel of primary colour of red of the first display layer is provided a subpixel of primary colour of green of the second display layer; corresponding to a subpixel of primary colour of green of the first display layer is provided a subpixel of primary colour of blue of the second display layer; corresponding to a subpixel of primary colour of blue of the first display layer is provided a subpixel of primary colour of red of the second display layer.

Optionally, each of the subpixels of the first display layer and the second display layer comprises a transparent anode, a light-emitting layer and a translucent cathode.

Optionally, the conversion layer comprises a liquid crystal layer, and one or more driving electrodes which are configured to drive the liquid crystal layer; when the one or more driving electrodes are loaded with a driving voltage, the conversion layer is opaque and in the light-shielding state, when the one or more driving electrodes are not loaded with the driving voltage, the conversion layer is light-transmitting and in the light-transmitting state.

Optionally, the one or more driving electrodes comprise a first driving electrode and a second driving electrode; the conversion layer comprises: an upper polarizer and a lower polarizer whose polarization direction is perpendicular to each other; a liquid crystal cell sandwiched between the upper polarizer and the lower polarizer, the liquid crystal cell being formed by oppositely arranging a first substrate and a second substrate, a first transparent conductive layer being provided on the first substrate, a first orientation layer being provided on the first transparent conductive layer, a second transparent conductive layer being provided on the second substrate, a second orientation layer being provided on the second transparent conductive layer, the first driving electrode layer being formed by the first transparent conductive layer, and the second driving electrode layer being formed by the second transparent conductive layer.

Optionally, the one or more driving electrodes are Indium Tin Oxide ITO electrodes.

An embodiment of this disclosure further provides a double-sided display system, comprising the double-sided display device as above, and a watching auxiliary device which is matched with the double-sided display device in use, wherein a display picture of the double-sided display device is displayed to a viewer via the watching auxiliary device, during a display phase of the double-sided display device; and the a display picture is not displayed to the viewer via the watching auxiliary device, during an interfering phase of the double-sided display device.

Optionally, the watching auxiliary device comprises a pair of shutter glasses; the shutter glasses are in a state of opening, during the display phase of the double-sided display device; and the shutter glasses are in a state of light-shielding, during the interfering phase of the double-sided display device.

An embodiment of this disclosure further provides a double-sided display method, being applied to the double-sided display device as above, wherein the double-sided display method comprises: a display phase, wherein a conversion layer of the double-sided display device is in a light-shielding state, and both the first side and the second side of the double-sided display device are loaded with display signals to display images; an interfering phase following the display phase, wherein the conversion layer is in a light-transmitting state, a first display layer of the double-sided display device is loaded with a first interfering signal to interfere with the image displayed by the second side, and a second display layer of the double-sided display is loaded with a second interfering signal to interfere with the image displayed by the first side, making a person without the watching auxiliary device not able to obtain a valid picture.

Optionally, a first time period corresponding to the display phase and a second time period corresponding to the interfering phase form a frame time of a picture.

Optionally, the watching auxiliary device switches between a state of opening and a state of light-shielding; during the display phase, the watching auxiliary device is in the state of opening; and during the interfering phase, the watching auxiliary device is in the state of light-shielding.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

The technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on basis of the embodiments of the present disclosure by a person of ordinary skill in the art without paying any creative effort shall be included in the protection scope of the present disclosure.

Figure 1:
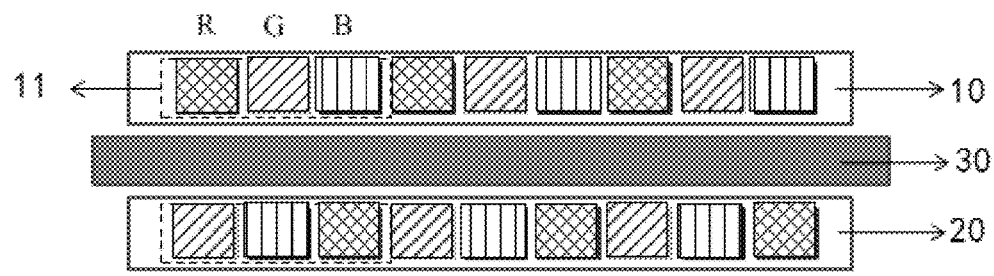
FIG. 1 is a structure diagram of a double-sided display device provided in an embodiment of the present disclosure.

An embodiment of the present disclosure provides a double-sided display device as shown in FIG. 1, which is capable of solving the anti-peeping problem of double-sided display. The double-sided display device includes: a first display layer 10, configured to implement output of a display signal of a first side of the double-sided display device, making the first side of the double-sided display device display an image; a second display layer 20, configured to implement output of a display signal of a second side of the double-sided display device, making the second side of the double-sided display device display an image; a conversion layer 30 positioned between the first display layer 10 and the second display layer 20. The conversion layer 30 is able to switch between a light-transmitting state and an opaque light-shielding state. The conversion layer 30 is in the light-shielding state during a display phase, and in the light-transmitting state during an interfering phase following the display phase. The first display layer 10 is further configured to output a first interfering signal to interfere with the image displayed by the second side during the interfering phase, and the second display layer 20 is further configured to output a second interfering signal to interfere with the image displayed by the first side during the interfering phase, so that an unauthorized user is not able to obtain a valid picture.

Figure 2:
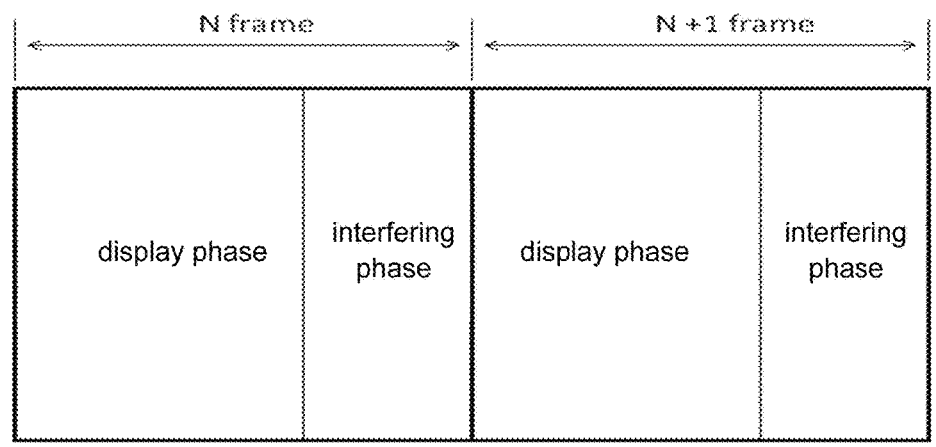
FIG. 2 is a schematic diagram of a double-sided display device in an embodiment of the present disclosure.

One characteristic of the double-sided display device in the present embodiment may be anti-peeping on both side of the double-sided display device. The first display layer is configured to output a display signal for the first side and an interfering signal for the second side (i.e. a first interfering signal to interfere with the image displayed by the second side), and the second display layer is configured to output a display signal for the second side and an interfering signal for the first side (i.e. a second interfering signal to interfere with the image displayed by the first side). As shown in FIG. 2, a display time of one picture (e.g., a frame time) is divided into the two parts or at least includes the two parts: a first part of display phase, and a second part of interfering phase. Specific length of the two parts is not limited, so long as the purpose of anti-peeping is achieved.

Figure 3:
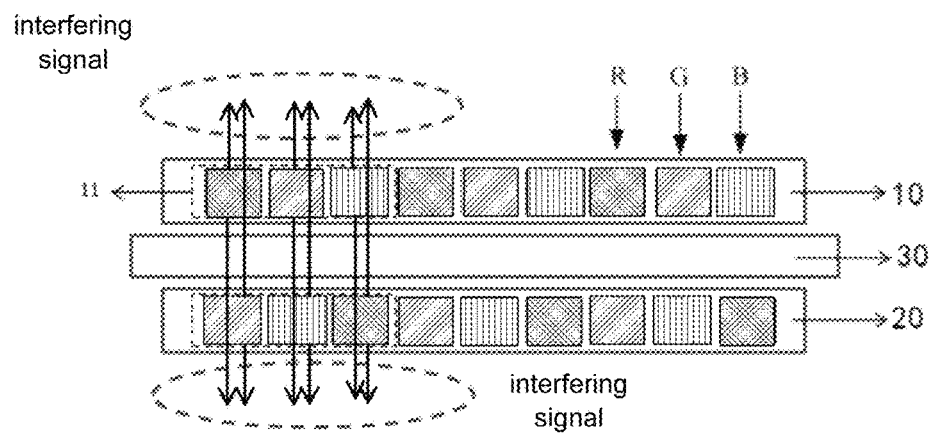
FIG. 3 is a working schematic diagram of an interfering phase of a double-sided display device in an embodiment of the present disclosure.

During the display phase, the conversion layer 30 is on light-shielding state and is not light-transmitting (at least, the light which is for display is not transmitted), and the first display layer 10 and the second display layer 20 are loading corresponding display signals to display images respectively. During interfering phase, the conversion layer 30 switches to light-transmitting state, and light is allowed to transmit through the conversion layer 30 (at least, the light which is for display is allowed to transmit). And, the first display layer 10 is loaded with a first interfering signal to interfere with the image displayed by the second side, and the second display layer 20 is loaded with a second interfering signal to interfere with the image displayed by the first side. As shown in FIG. 3, an interfering signal of one side of the first side and the second side passes through the conversion layer 30 and overlaps with a display signal of the other side of the first side and the second side, and the overlapped signals are output. Such that, an interfering signal with brightness which is twice the brightness of the display signal at a side of the first side and the second side can be obtained at that side. Thus, with the interfering effect and the anti-peeping effect guaranteed, duration of the interfering phase is reduced.

The double-sided display device in the present embodiment is matched with a watching auxiliary device to achieve normal watching effect by a user. The watching auxiliary device is configured to filter out an interfering signal. Specifically, during the display phase of the double-sided display device, a display picture of the double-sided display device are displayed to a viewer via the watching auxiliary device; during the interfering phase of the double-sided display device, no display pictures of the double-sided display device are displayed to a viewer via the watching auxiliary device. A specific person wearing the watching auxiliary device receives only one or more pictures of the display phase via the watching auxiliary device, so that the watching purpose is achieved. Due to effect of an interfering signal of the interfering phase, a person without wearing the watching auxiliary device basically could not be able to obtain a valid picture.

In the present embodiment, display theory and specific structure of the first and second display layer are not limited, so long as the foregoing effect of anti-peeping is not impacted. In order to let a person of ordinary skill in the art understand the structure of the double-sided device provided in the present disclosure better, the double-sided device provided in the present disclosure will be described in detail by specific embodiments.

Figure 4:
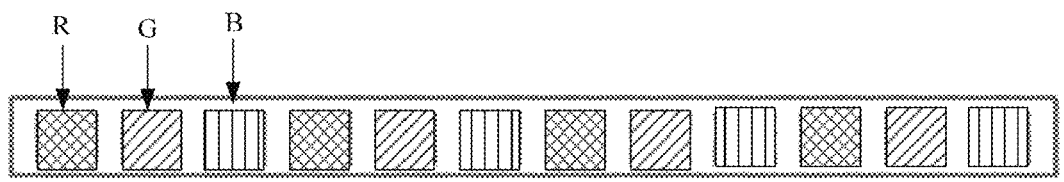
FIG. 4 is a structure diagram of a display layer of a double-sided display device in an embodiment of the present disclosure.
Figure 5:
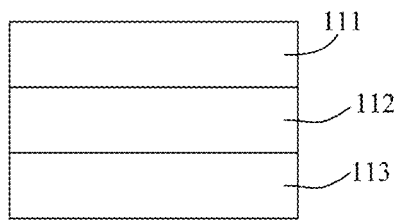
FIG. 5 is a structure diagram of a subpixel of a double-sided display device in an embodiment of the present disclosure.

Both of the first display layer 10 and the second display layer 20 of the double-sided display device include a plurality of pixels 11. Each of the plurality of pixels 11 includes a plurality of subpixels in different primary colours respectively, e.g., three kinds of subpixels in primary colours of red/green/blue (i.e., R\G\B subpixels), specifically as shown in FIG. 4. Each of plurality of subpixel has a transparent OLED structure, including a transparent anode 111, a light-emitting layer 112 and a translucent cathode 113, as specifically shown in FIG. 5.

The subpixels of the first display layer 10 and the subpixels of the second display layer 20 are positioned in one-to-one correspondence, and the primary colour of a subpixel of the first display layer 10 is not identical with that of a corresponding subpixel of the second display layer 20. For example, as shown in FIG. 3, each pixel of the first display layer 10 and the second display layer 20 includes subpixels in three primary colours of red, green and blue. Corresponding to a subpixel of primary colour of red (R subpixel) of the first display layer 10 is provided a subpixel of primary colour of green (G subpixel) of the second display layer 20, that is, a R subpixel of the first display layer 10 and a G subpixel of the second display layer 20 are facing each other with the conversion layer 30 therebetween. Corresponding to a subpixel of primary colour of green (G subpixel) of the first display layer 10 is provided a subpixel of primary colour of blue (B subpixel) of the second display layer 20, that is, a G subpixel of the first display layer 10 and a B subpixel of the second display layer 20 are facing each other with the conversion layer 30 therebetween. Corresponding to a subpixel of primary colour of blue (B subpixel) of the first display layer 10 is provided a subpixel of primary colour of red (R subpixel) of the second display layer 20, that is, a B subpixel of the first display layer 10 and a R subpixel of the second display layer 20 are facing each other with the conversion layer 30 therebetween. During the interfering phase, the conversion layer 30 in the middle switches to the light-transmitting state, and light (i.e. interfering signal) is allowed to transmit through the conversion layer 30. So the interfering light in a different colour with identical brightness is mixed with the display light from a corresponding subpixel and thus the colour of the displayed picture deviate from the true colour which is required to be displayed, thus the purpose of anti-peeping is achieved.

Certainly, there may be other corresponding relationships, and the purpose of mixing in interfering colour will be achieved only if the corresponding subpixels have different colours. Further for example, an R subpixel of the first display layer 10 and a B subpixel of the second display layer 20 are facing each other the conversion layer 30 therebetween. A G subpixel of the first display layer 10 and an R subpixel of the second display layer 20 are facing each other with the conversion layer 30 therebetween. A B subpixel of the first display layer 10 and a G subpixel of the second display layer 20 are facing each other with the conversion layer 30 therebetween. The foregoing subpixels are positioned in one-to-one correspondence. It is only one embodiment according to the present disclosure that the corresponding subpixels have different colours. Actually, there are many other solutions in practice, e.g., the subpixels are positioned in one-to-one correspondence, but colours of the corresponding subpixels may be partially identical. It is not limited in the present embodiment, so long as interfering colour is mixed in as an implementing result and one or more valid pictures can be shielded by an interfering signal.

The conversion layer 30 in the double-sided display device of the present embodiment includes: a liquid crystal layer, and one or more driving electrodes which are configured to drive the liquid crystal layer. When the one or more driving electrode layers are loaded with a driving voltage, the conversion layer is opaque and in the light-shielding state. When the one or more driving electrode layers is not loaded with the driving voltage, the conversion layer is light-transmitting and in the light-transmitting state.

Figure 6:
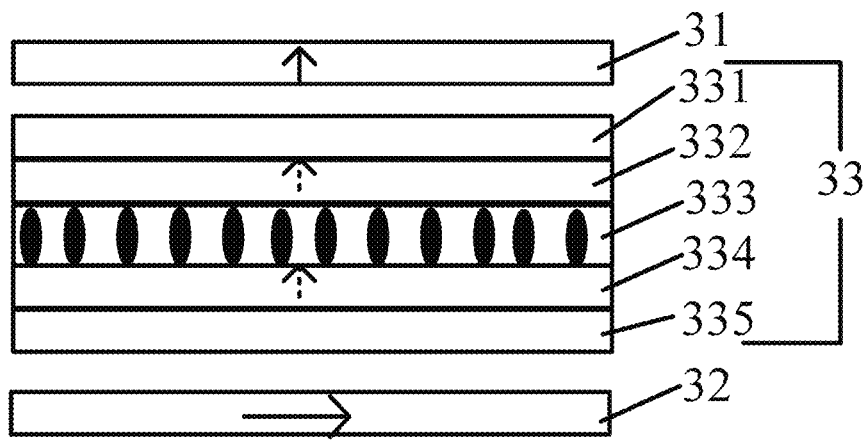
FIG. 6 is a structure diagram of a conversion layer of a double-sided display device in an embodiment of the present disclosure.

The one or more driving electrodes generally include a first driving electrode and a second driving electrode. For an ultra twisted nematic (TN) liquid crystal as shown in FIG. 6, the conversion layer 30 generally includes an upper polarizer 31 and a lower polarizer 32 whose polarization direction is perpendicular to each other, a liquid crystal cell 33 sandwiched between the upper polarizer 31 and the lower polarizer 32. The liquid crystal cell 33 is formed by oppositely arranging a first substrate and a second substrate, and sandwiching the liquid crystal layer 333 between the first substrate and the second substrate. A first transparent conductive layer 331 is provided on the first substrate, and a first orientation layer 332 is provided on the first transparent conductive layer 331. A second transparent conductive layer 335 is provided on the second substrate, and a second orientation layer 334 is provided on the second transparent conductive layer 335. The first driving electrode layer is formed by the first transparent conductive layer 331. The second driving electrode layer is formed by the second transparent conductive layer 335. In FIG. 6, solid arrows show the polarization directions of the polarizers, and dashed arrows show the orientation directions of the orientation layers. The forgoing driving electrode layers are optionally made of Indium Tin Oxide (ITO). That is to say, the plurality of driving electrodes are optionally Indium Tin Oxide (ITO) electrodes.

Alternatively, the first and second driving electrode may be formed in a same transparent conductive layer. At such time, the liquid crystal cell is generally ADS (Advanced-Super Dimensional Switching) which may implement the foregoing function of the conversion layer as well.

It is necessary for the foregoing double-sided display device to match with a watching auxiliary device in use. The watching auxiliary device of the present embodiment may be a pair of shutter glasses. When the foregoing double-sided display device is during a display phase, both the left shutter glass and the right shutter glass are open, that is, both the left shutter glass and the right shutter glass are in a state of light-transmitting, and one or more pictures displayed by the device can be displayed to a wearer via the shutter glasses. When the foregoing double-sided display device is during an interfering phase, both the left shutter glass and the right shutter glass are closed, that is, both the left shutter glass and the right shutter glass are in a state of light-shielding, and a display picture cannot be displayed via the shutter glasses. The display phase and the interfering phase of the display device need to be synchronous with the open state and closed state of the shutter glasses respectively. It can be implemented via communications between the shutter glasses and the double-sided display device. And such synchronous communications may only occur at an initial phase after the shutter glasses being in operation, and take place at a preset frequency hereafter. Certainly, the double-sided display device also can automatically search for the shutter glasses and give a notice to the shutter glasses about its changing, only if a setting of the double-sided display device is changed.

When watching the display device with the foregoing shutter glasses, one or more normal pictures may be obtained because the shutter glasses only receive signals of the display phase. When watching the display device after taking off the shutter glasses (or without a watching auxiliary device), due to the persistence of vision, each display pixels is mixed in interfering colour with identical brightness (the interfering colour is corresponding with an interfering signal during the interfering phase, specific brightness and colour mixed in can be obtained by adjusting values of the first and second interfering signals), such that a display picture deviate from the true colour which is required to display and the purpose of anti-peeping is achieved. Meanwhile, an interfering signal could be filtered out by the shutter glasses, such that an authorized specific person (i.e. a person wearing the shutter glasses) could watch the pictures displayed by the display device normally.

The watching auxiliary device may be an accessory of the foregoing double-sided display device, or the watching auxiliary device may be an independent product which forms a display system together with the double-sided display device. It is not limited in the present embodiment.

The foregoing double-sided display device may be electronic paper, a OLED panel, a mobile phone, a mobile phone, a tablet computer, a television, a monitor, a laptop, a digital photo frame, a navigator or any other products or components having display functions.

Figure 7:
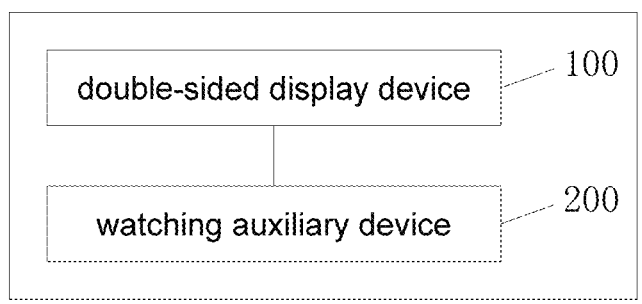
FIG. 7 is a structure diagram a double-sided display system in an embodiment of the present disclosure.

As shown in FIG. 7, an embodiment of the present disclosure further provides a double-sided display system which includes any double-sided display device 100 provided in the above embodiment. Because the double-sided display system outputs an interfering signal during an interfering phase, a person without a watching auxiliary device is not able to obtain a valid picture. Further, the double-sided display system also includes a watching auxiliary device 200 which is matched with the double-sided display device 100 in use. During a display phase of the double-sided display device, a display picture of the double-sided display device 100 is displayed to a viewer via the watching auxiliary device 200. During an interfering phase of the double-sided display device, the a display picture of the double-sided display device 100 could not displayed to the viewer via the watching auxiliary device 200.

Figure 8:
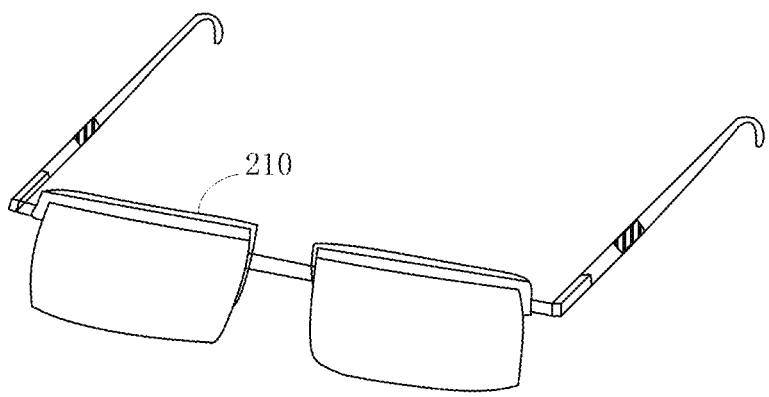
FIG. 8 is of a structure diagram of watching auxiliary device in an embodiment of the present disclosure.

Optionally, as shown in FIG. 8, the watching auxiliary device 200 may be a pair of shutter glasses 210. During the display phase of the double-sided display device 100, the shutter glasses 210 are in a state of opening. During the interfering phase of the double-sided display device, the shutter glasses 210 are in a state of light-shielding. Only one or more pictures of the display phase are received via the watching auxiliary device, so the purpose of normal watching is achieved. And due to the existence of an interfering signal, a display picture deviate from true colour which is required to display, thus an unauthorized person is not able to obtain a valid picture and the purpose of anti-peeping is achieved.

The glasses of the shutter glasses 210 may include: a liquid crystal layer, and one or more driving electrodes which are configured to drive the liquid crystal layer. When the driving electrode layers load a driving voltage, the glasses of the shutter glasses 210 are opaque and in the light-shielding state. When the driving electrode layers do not load the driving voltage, the glasses of the shutter glasses 210 are light-transmitting and in the state of opening. The structure of the glasses of the shutter glasses 210 may be similar to that of the conversion layer 30 shown in FIG. 6, and will not be described again.

An embodiment of the present disclosure further provides a double-sided display method which is applied to any double-sided display device provided in the above embodiment. The double-sided display method includes: a display phase, where a conversion layer of the double-sided display device is in a light-shielding state, and both a first side and a second side of the double-sided display device are loaded with display signals to display images; an interfering phase following the display phase, where the conversion layer is in a light-transmitting state, and a first display layer of the double-sided display device is loaded with a first interfering signal to interfere with the image displayed by the second side, and a second display layer of the double-sided display device is loaded with a second interfering signal to interfere with the image displayed by the first side, so that a person without a watching auxiliary device is not able to obtain a valid picture.

In a specific embodiment, a frame time of a picture may be divided into a first time period corresponding to the foregoing display phase and a second time period corresponding to the foregoing interfering phase. That is, a frame time of a picture is divided into two parts, i.e. a first time period and a second time period. During the first time period, the conversion layer is in the light-shielding state, and each of the first side and the second side of the double-sided display device is loaded with display signals to display images. During the second time period followed the first time segment, the conversion layer is in the light-transmitting state, and the first display layer is loaded with a first interfering signal to interfere with the image displayed by the second side, and the second display layer is loaded with a second interfering signal to interfere with the image displayed by the first side, so that a person without a watching auxiliary device is not able to obtain a valid picture. Meanwhile, the normal watching purpose is achieved, if only the one or more pictures of the display phase are received via the watching auxiliary device.

In embodiments of the present disclosure, sequence numbers of steps cannot be used for limiting the sequences of these steps. To those of ordinary skill in the art, changes of the sequences of the steps therein without paying any creative effort are also within the scope of the disclosure.

It should be understood by those of ordinary skill in the art that all or part of the procedures in the foregoing embodiments of a method may be implemented with one or more computer programs instructing corresponding hardwares. The foregoing programs may be stored in a computer readable storage medium. The procedures of the embodiments of the respective methods mentioned above may be included when the programs are executed; and the foregoing storage medium includes a magnetic disk, an optical disk, a Read-Only Memory (ROM), a Random Access Memory (RAM), or the like.

The present disclosure provides a double-sided display device, system and method. The double-sided display device includes: a first display layer, a second display layer, and a conversion layer positioned between the first display layer and the second display layer. The conversion layer is able to switch between a light-transmitting state and an opaque light-shielding state. During a display phase, the conversion layer is in the light-shielding state, and both of the first display layer and the second display layer load a display signal to implement displaying. During an interfering phase followed the display phase, the conversion layer is in the light-transmitting state. During this phase (i.e. the interfering phase), both of the first display layer and the second display layer produce an interfering signal. Since the conversion layer is in the light-transmitting state during the interfering phase, an interfering signal produced by one side are transmitted through the conversion layer to the other side, so that a person without a watching auxiliary device is not able to obtain a valid picture and thus anti-peeping is achieved. Meanwhile, one or more pictures of the display phase may be achieved to a specific person via the watching auxiliary device, so that the watching purpose is achieved.

Additional embodiments including any one of the embodiments described above may be provided by the disclosure, where one or more of its components, functionalities or structures is interchanged with, replaced by or augmented by one or more of the components, functionalities or structures of a different embodiment described above.

The foregoing descriptions are merely specific implementation manners of the disclosure, rather than limiting the protection scope of the application. Any change or substitution that is readily conceived for any one skilled in the art within the technical scope disclosed by the disclosure shall fall into the protection scope of the application. Therefore, the protection scope of the present disclosure shall be defined by the claims.

What is claimed is:

1. A double-sided display device, comprising:
a first display layer, configured to implement output of a display signal of a first side of the double-sided display device, making the first side of the double-sided display device display an image,
a second display layer, configured to implement output of a display signal of a second side of the double-sided display device, making the second side of the double-sided display device display an image, and
a conversion layer positioned between the first display layer and the second display layer, which switches between a light-transmitting state and an opaque light-shielding state,
wherein, the conversion layer is in the light-shielding state during a display phase, and in the light-transmitting state during an interfering phase which follows the display phase; the first display layer is further configured to output a first interfering signal to interfere with the image displayed by the second side during the interfering phase, and the second display layer is further configured to output a second interfering signal to interfere with the image displayed by the first side during the interfering phase, making an unauthorized user not able to obtain a valid picture.

2. The double-sided display device according to claim 1, wherein, both the first display layer and the second display layer comprise a plurality of pixels, each of the plurality of pixels comprising a plurality of subpixels in different primary colours respectively;
wherein, the subpixels of the first display layer and the subpixels of the second display layer are positioned in one-to-one correspondence,
the primary colour of one of the subpixels of the first display layer is not identical with that of a corresponding subpixel of the subpixels of the second display layer.

3. The double-sided display device according to claim 2, wherein each of the pixels of the first display layer and the second display layer comprises three kinds of subpixels in primary colours of red, green and blue respectively;
corresponding to a subpixel of primary colour of red of the first display layer is provided a subpixel of primary colour of green of the second display layer;
corresponding to a subpixel of primary colour of green of the first display layer is provided a subpixel of primary colour of blue of the second display layer;
corresponding to a subpixel of primary colour of blue of the first display layer is provided a subpixel of primary colour of red of the second display layer.

4. The double-sided display device according to claim 2, wherein each of the subpixels of the first display layer and the second display layer comprises a transparent anode, a light-emitting layer and a translucent cathode.

5. The double-sided display device according to claim 1, wherein the conversion layer comprises a liquid crystal layer, and one or more driving electrodes which are configured to drive the liquid crystal layer;
when the one or more driving electrodes are loaded with a driving voltage, the conversion layer is opaque and in the light-shielding state, when the one or more driving electrodes are not loaded with the driving voltage, the conversion layer is light-transmitting and in the light-transmitting state.

6. The double-sided display device according to claim 5, wherein the one or more driving electrodes comprise a first driving electrode and a second driving electrode;
the conversion layer comprises: an upper polarizer and a lower polarizer whose polarization direction is perpendicular to each other; a liquid crystal cell sandwiched between the upper polarizer and the lower polarizer, the liquid crystal cell being formed by oppositely arranging a first substrate and a second substrate, a first transparent conductive layer being provided on the first substrate, a first orientation layer being provided on the first transparent conductive layer, a second transparent conductive layer being provided on the second substrate, a second orientation layer being provided on the second transparent conductive layer, the first driving electrode layer being formed by the first transparent conductive layer, and the second driving electrode layer being formed by the second transparent conductive layer.

7. The double-sided display device according to claim 5, wherein the one or more driving electrodes are Indium Tin Oxide ITO electrodes.

8. A double-sided display system, comprising a double-sided display device according to claim 1, and a watching auxiliary device which is matched with the double-sided display device in use, wherein
a display picture of the double-sided display device is displayed to a viewer via the watching auxiliary device, during a display phase of the double-sided display device; and the display picture is not displayed to the viewer via the watching auxiliary device, during an interfering phase of the double-sided display device.

9. The double-sided display system according to claim 8, wherein the watching auxiliary device comprises a pair of shutter glasses;
the shutter glasses are in a state of opening, during the display phase of the double-sided display device; and the shutter glasses are in a state of light-shielding, during the interfering phase of the double-sided display device.

10. A double-sided display method, being applied to a double-sided display device according to claim 1, wherein the double-sided display method comprises:

a display phase, wherein a conversion layer of the double-sided display device is in a light-shielding state, and both the first side and the second side of the double-sided display device are loaded with display signals to display images;

an interfering phase following the display phase, wherein the conversion layer is in a light-transmitting state, a first display layer of the double-sided display device is loaded with a first interfering signal to interfere with the image displayed by the second side, and a second display layer of the double-sided display is loaded with a second interfering signal to interfere with the image displayed by the first side, making a person without the watching auxiliary device not able to obtain a valid picture.

11. The double-sided display method according to claim 10, wherein a first time period corresponding to the display phase and a second time period corresponding to the interfering phase form a frame time of a picture.

12. The double-sided display method according to claim 10, wherein the watching auxiliary device switches between a state of opening and a state of light-shielding;

during the display phase, the watching auxiliary device is in the state of opening; and during the interfering phase, the watching auxiliary device is in the state of light-shielding.

* * * * *